(12) United States Patent
Hutchings

(10) Patent No.: US 10,229,678 B2
(45) Date of Patent: Mar. 12, 2019

(54) DEVICE-DESCRIBED NATURAL LANGUAGE CONTROL

(71) Applicant: Microsoft Technology Licensing, LLC, Redmond, WA (US)

(72) Inventor: Justin A. Hutchings, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 15/294,322

(22) Filed: Oct. 14, 2016

(65) Prior Publication Data

US 2018/0108349 A1    Apr. 19, 2018

(51) Int. Cl.
| | | |
|---|---|---|
| *G06F 17/27* | (2006.01) | |
| *G10L 15/22* | (2006.01) | |
| *G10L 15/28* | (2013.01) | |
| *G10L 15/30* | (2013.01) | |

(52) U.S. Cl.
CPC .............. *G10L 15/22* (2013.01); *G06F 17/27* (2013.01); *G10L 15/28* (2013.01); *G10L 15/30* (2013.01); *G10L 2015/223* (2013.01)

(58) Field of Classification Search
CPC .......... G10L 15/28; G10L 15/30; G10L 15/22
See application file for complete search history.

(56) References Cited

U.S. PATENT DOCUMENTS

| | | | | |
|---|---|---|---|---|
| 5,054,082 A | * | 10/1991 | Smith | ..................... G10L 15/00 379/88.01 |
| 5,117,460 A | * | 5/1992 | Berry | ...................... G10L 15/00 340/7.39 |
| 5,774,859 A | * | 6/1998 | Houser | .............. H04N 5/44543 348/E5.103 |
| 6,243,675 B1 | * | 6/2001 | Ito | ......................... G06F 17/275 704/231 |

(Continued)

OTHER PUBLICATIONS

Lawson, Stephen, "AllJoyn IoT platform reaches out to the Internet for remote control", Published on: Jan. 6, 2015 Available at: http://www.pcworld.com/article/2866252/alljoyn-iot-platform-reaches-out-to-the-internet-for-remote-control.html.

*Primary Examiner* — Eric Yen
(74) *Attorney, Agent, or Firm* — Mike Cicero; Newport IP, LLC

(57) ABSTRACT

A remote device has an associated natural language description that includes a record of commands supported by the remote device. This record of commands includes command names, the command functions to which those names correspond, and natural language strings that are the natural language words or phrases that correspond to the command. A computing device includes a device control module that obtains the natural language description for the remote device and provides the natural language strings to a natural language assistant on the computing device. The natural language assistant monitors the natural language inputs to the computing device, and notifies the device control module when a natural language input matches one of the natural (Continued)

language strings. The device control module uses the natural language description to determine the command name that corresponds to the matching natural language string, and communicates the command name to the remote device.

20 Claims, 4 Drawing Sheets

(56) References Cited

U.S. PATENT DOCUMENTS

| | | | |
|---|---|---|---|
| 6,535,854 B2 | 3/2003 | Buchner et al. | |
| 6,584,439 B1 | 6/2003 | Geilhufe et al. | |
| 6,615,177 B1 | 9/2003 | Rapp et al. | |
| 6,654,720 B1 | 11/2003 | Graham et al. | |
| 6,963,836 B2* | 11/2005 | Van Gestel | G06F 3/16 |
| | | | 704/251 |
| 7,027,975 B1* | 4/2006 | Pazandak | G06F 17/30684 |
| | | | 704/9 |
| 7,136,818 B1* | 11/2006 | Cosatto | G10L 15/1807 |
| | | | 704/275 |
| 7,184,960 B2 | 2/2007 | Deisher et al. | |
| 7,366,673 B2 | 4/2008 | Ruback et al. | |
| 7,689,420 B2 | 3/2010 | Paek et al. | |
| 7,725,308 B2 | 5/2010 | Russell | |
| 7,831,426 B2 | 11/2010 | Bennett | |
| 8,126,697 B1* | 2/2012 | Manroa | G06F 17/289 |
| | | | 379/88.05 |
| 8,521,513 B2 | 8/2013 | Millett et al. | |
| 8,620,667 B2 | 12/2013 | Andrew | |
| 8,768,711 B2 | 7/2014 | Ativanichayaphong et al. | |
| 9,443,527 B1* | 9/2016 | Watanabe | G10L 15/22 |
| 9,659,563 B1* | 5/2017 | Neff | G10L 17/22 |
| 2002/0069063 A1* | 6/2002 | Buchner | H04L 12/2803 |
| | | | 704/270 |
| 2003/0069734 A1 | 4/2003 | Everhart | |
| 2004/0044517 A1* | 3/2004 | Palmquist | G06F 17/2809 |
| | | | 704/7 |
| 2004/0064322 A1* | 4/2004 | Georgiopoulos | G10L 15/26 |
| | | | 704/277 |
| 2005/0114141 A1* | 5/2005 | Grody | G10L 15/30 |
| | | | 704/270 |
| 2006/0136220 A1* | 6/2006 | Gurram | G10L 15/005 |
| | | | 704/275 |
| 2007/0043566 A1* | 2/2007 | Chestnut | G10L 15/075 |
| | | | 704/257 |
| 2007/0124132 A1* | 5/2007 | Takeuchi | G06F 17/275 |
| | | | 704/9 |
| 2008/0235027 A1* | 9/2008 | Cross | G10L 15/22 |
| | | | 704/270.1 |
| 2014/0180671 A1* | 6/2014 | Osipova | G06F 9/454 |
| | | | 704/8 |
| 2014/0257788 A1* | 9/2014 | Xiong | H04N 21/25816 |
| | | | 704/8 |
| 2015/0032440 A1* | 1/2015 | Hale | G06F 17/289 |
| | | | 704/3 |
| 2015/0160921 A1* | 6/2015 | Davis | H04L 67/10 |
| | | | 707/752 |
| 2015/0281856 A1* | 10/2015 | Park | H04R 25/505 |
| | | | 381/320 |

* cited by examiner

DEVICE-DESCRIBED NATURAL LANGUAGE CONTROL

BACKGROUND

As computing technology has advanced, computing devices have become increasingly widespread. Various different types of computing devices are found throughout our daily lives, including high-performance desktop computers, mobile phones, smart devices such as televisions, and so forth. While having access to this wide variety of devices is beneficial, it is not without its problems. One such problem is that oftentimes a user desires to control one device with another. Such control, however, remains difficult, which can lead to user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request is sent to a remote device for a natural language description for the remote device. The natural language description for the remote device maps one or more natural language strings to each of one or more functionalities of the remote device. The natural language description is received and registered with a natural language assistant to monitor natural language inputs to the computing device. An indication that a natural language input to the computing device matches a natural language string in the natural language description is received from the natural language assistant. Particular functionality of the remote device that maps to the matching natural language string is identified, and a command is communicated to the remote device to perform the particular functionality.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
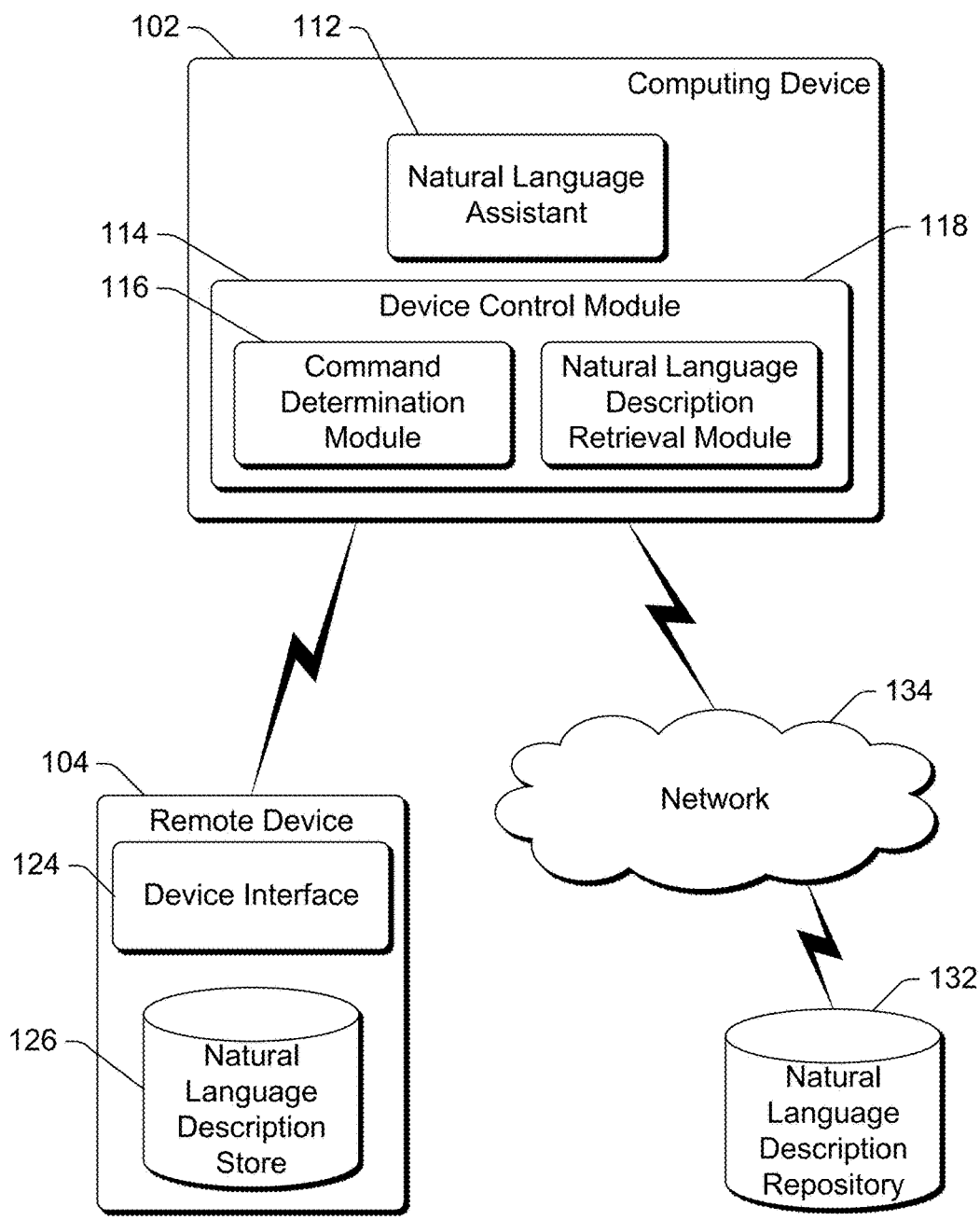
FIG. 1 illustrates an example system implementing the device-described natural language control in accordance with one or more embodiments.

Device-described natural language control is discussed herein. The techniques discussed herein are directed to using natural language to control a remote device using a computing device. The remote device can be a smart device, which is a low-resource device that can receive control commands from the computing device. Such a smart device can be, for example, a television, a light bulb, a thermostat, and so forth. The natural language input to the computing device can be voice input or other input (e.g., text or chat input).

The remote device has an associated natural language description that includes a record of commands supported by the remote device. This record of commands includes command names (command identifiers) and the command functions to which those names correspond. This record also includes a set of one or more strings, for each command, that are the natural language words or phrases that correspond to the command. These strings are also referred to as natural language strings. For example, for a television, a command name "on" may have a corresponding function of "power on the television", and a set of one or more natural language strings including "on", "turn on", and "power up". The record can include natural language strings in various different languages, such as English, Spanish, Chinese, and so forth. The record can also include natural language strings in various different grammars (e.g., for different grammars supported by different natural language assistants). These different natural language strings and/or grammars can be included in the same natural language description, or different natural language descriptions can be implemented for different natural language strings and/or grammars.

The computing device includes a device control module that obtains the natural language description for the remote device. The remote device can store the natural language description and provide the natural language description to the computing device. Alternatively the remote device can store an indication of a location where the natural language description for the remote device is stored, such as at some location on the Internet or in a cloud service. The remote device can provide that indication to the computing device, and the device control module can use that indication to obtain the natural language description.

The device control module provides the natural language description to a natural language assistant on the computing device. The natural language assistant is a module or component that provides various assistant functionality to users of the computing device, allowing the users to provide natural language inputs (e.g., speak their requests) and have the requests carried out. The natural language assistant includes functionality to receive and analyze natural language inputs.

The device control module leverages the functionality of the natural language assistant by providing the natural language strings in the natural language description to the natural language assistant. The natural language assistant monitors the natural language inputs to the computing device, and notifies the device control module when a natural language input matches (e.g., is the same as) one of the natural language strings in the natural language description. An indication of the matching natural language string is provided to the device control module.

The device control module implements a protocol for communicating with the remote device. Various different wired and/or wireless protocols can be used, such as Bluetooth®, AllJoyn®, and so forth. When the device control module receives the indication of the matching natural language string from the natural language assistant, the device control module uses the natural language description for the remote device to determine the command name that corresponds to the matching natural language string. The device control module then uses the protocol to execute that command name or update the state of the remote device. Thus, the natural language command input by the user to the computing device is converted to a command communicated to the remote device.

Using the techniques discussed herein, the remote device identifies the natural language description to the computing device. The natural language description is then used by a natural language assistant on the computing device to determine when natural language inputs corresponding to commands of the remote device are received at the computing device. The developer of the remote device is alleviated of the responsibility of developing and implementing a natural language processing service for their remote devices. This reduces development time for the remote devices, allowing the remote devices to be made available to users sooner. Furthermore, by leveraging the natural language assistant of the computing device, users can interact with a natural language assistant that they are already familiar with. This improves usability of the computing device as well as the remote device, and makes for a better user experience.

FIG. 1 illustrates an example system 100 implementing the device-described natural language control in accordance with one or more embodiments. The system 100 includes a computing device 102 that can communicate with a remote device 104. The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

The remote device 104 can similarly be any of a variety of different types of devices, analogous to the discussion above regarding the computing device 102. In one or more embodiments, the computing device 102 is a mobile device and the remote device 104 is a smart device. A smart device refers to a remote device that can connect to other devices, in one or more embodiments wirelessly, and that can operate both interactively (e.g., controlled in response to commands from other computing devices) and autonomously. In one or more embodiments, a smart device is a low-resource device. Examples of smart devices include a television, a light bulb, a thermostat, IoT devices, and so forth.

The computing device 102 and the remote device 104 can communicate with one another using some protocol. Any of a variety of different protocols can be supported, such as Bluetooth® as described in the Bluetooth Core Specification Version 2.1 (2007), Bluetooth low energy as described in the Bluetooth Core Specification Version 4.0 (2010), the AllJoyn® framework as described by the AllSeen Alliance, the OCF (open connectivity foundation) framework as described by the Open Connectivity Foundation, the Simple Object Access Protocol (SOAP) as described in the SOAP Version 1.2 Part 1: Messaging Framework (2007), the Web Services on Devices (WSD) framework as described by Microsoft Corporation, the Weave framework as described by Google Inc., and so forth. The protocol used by the computing device 102 and the remote device 104 to communicate with one another can be any of a variety of public and/or proprietary protocols. The computing device 102 and the remote device 104 can communicate directly with one another and/or communicate via any of a variety of different networks, such as a local area network (LAN), a phone network, the Internet, an intranet, other public and/or proprietary networks, combinations thereof, and so forth The computing device 102 includes a natural language assistant 112 and a device control module 114. In one or more embodiments, the natural language assistant 112 leverages one or more natural language processing modules located separately from the computing device 102 (e.g., in a cloud service). By leveraging a natural language processing module located separately from the computing device 102, the computing device 102 is alleviated of the need to have (or expend) the processing capability and/or energy to process the natural language inputs.

The remote device 104 includes a device interface 124 and a natural language description store 126. The device control module 114 includes a command determination module 116 and a natural language description retrieval module 118. The modules 116 and 118 of the device control module 114 along with the device interface 124 implement the communication protocol, allowing the computing device 102 and the remote device 104 to communicate with one another.

The remote device 104 has an associated natural language description that includes a record of commands supported by the remote device. This record of commands includes command names, the command functions to which those names correspond, and a set of natural language strings that correspond to each command.

Figure 2:
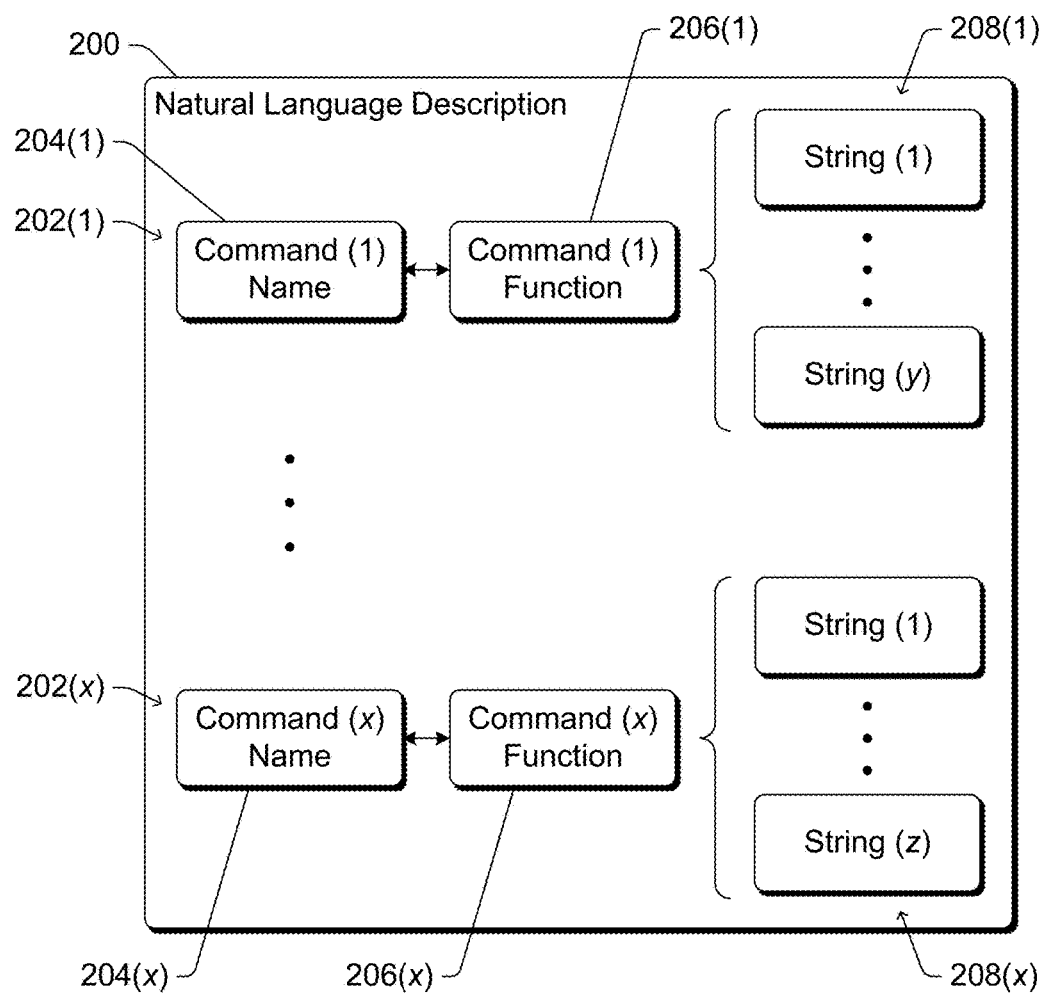
FIG. 2 illustrates an example natural language description for a remote device in accordance with one or more embodiments.

FIG. 2 illustrates an example natural language description 200 for a remote device in accordance with one or more embodiments. The natural language description 200 includes mapping information for multiple (x) commands 202(1), . . . , 202(x). For each command 202, there is a command name 204, a command function 206, and one or more (illustrated as multiple (y)) natural language strings 208. The command name 204 is an identifier of the command. The remote device understands the command name 204, and the command name 204 can be provided to the remote device to cause the remote device to perform the command. The command function 206 is a description of the command 202, describing what the command 202 is or does. The command function 206 provides a user friendly description of the command 202, allowing developers or users to readily understand what the command 202 is or does. Although illustrated as included in the command natural language description 202, the command function 206 need not be included in the natural language description 200.

The one or more natural language strings 208 are one or more natural language strings that correspond to the command 202. These natural language strings are natural language words or phrases that can be used to control the remote device. A natural language input by a user that corresponds to (e.g., matches) one of natural language strings 208 of a command 202 is interpreted as a user request to perform that command 202 on the remote device as discussed in more detail below. The mapping of command name, command function, and one or more natural language strings for a command allows one part of a command to be determined if given another part of the command. For example, given a command name, the one or more natural language strings that correspond to that command name can be readily identified using the mapping in the natural language description 200. By way of another example, given a natural language string, the command name corresponding to that natural language string can be readily identified using the mapping in the natural language description 200.

By way of example, the remote device may be a light bulb and the natural language description 200 can have commands for turning on the light bulb, turning off the light bulb, increasing the brightness of the light bulb, decreasing the brightness of the lightbulb, changing the color of the light bulb, and so forth. The command name for increasing the brightness of the light bulb can be "raise", the command function can be "increase bulb brightness", and the one or more natural language strings can be "brighter", "increase", "it's too dark in here", and so forth.

In one or more embodiments, the natural language strings can include non-optional words or characters as well as optional words or characters. A natural language input that matches at least the non-optional words in the natural language string matches the natural language string regardless of whether the optional words or characters are included in the natural language input. For example, a string may be "Turn on [the] [{name}] lights", where brackets denote optional words or characters and braces denote variables. Thus, in this example, "the" is optional and "name" is both optional and a variable. According, natural language inputs of "turn on lights", "turn on the lights", and "turn on the kitchen lights" are all valid matches for string.

In one or more embodiments, different natural language descriptions are maintained for the remote device. Each of these natural language descriptions corresponds to a particular language and/or grammar. Various different languages can be supported by the developer of the remote device as desired, such as English, Chinese, Spanish, German, and so forth. Various different grammars can also be supported by the developer of the remote device as desired. Different natural language assistants can use different grammars, and different natural language strings can be used for these different grammars. For example, two different computing devices may implement two different natural language assistants, each supporting a different grammar. Different natural language descriptions can be generated, one for each of these two different natural language assistants. Natural language descriptions can be generated for any combination of language and grammar desired by the developer of the remote device.

Alternatively, rather than having different natural language descriptions for different languages and/or grammars, a single natural language description can include the natural language strings for different languages and/or grammars. A particular one of these different languages and/or grammars can be selected by a computing device for use with the remote device.

In one or more embodiments, the natural language description 200 is a description that is generated by or on behalf of the developer of the remote device. Alternatively, the natural language description 200 can be generated by a third party for use with a general class of remote devices. For example, different classes of remote devices may include light bulbs, thermostats, stereos, and so forth. A third party (e.g., an organization) can generate a common natural language description for that class of devices, and any developer of a remote device of that class can use that common natural language description. Thus, rather than defining its own natural language description for a light bulb, a developer of the light bulb can use the common natural language description for the light bulb class of devices. This can reduce development time for the developer of the light bulb, and also provide a common natural language interface for users to provide natural language inputs to control various light bulbs from different developers. The natural language description retrieval module 118 of FIG. 1 can also use an identifier of the remote device class to obtain the natural language description regarding the remote device from a centralized repository, which may be maintained by, for example, a standards setting organization or the developer of the remote device. For example, rather than returning the natural language description, a light bulb can return an indication to the natural language description retrieval module of the light bulb class, and the natural language description retrieval module can use the indication to obtain the natural language description for the light bulb from a centralized repository.

Returning to FIG. 1, the remote device 104 includes a device interface 124 that allows communication with the computing device 102. The computing device 102 can request various information from the remote device 104 via the device interface 124. This information includes a natural language description for the remote device 104, and can also include additional information such as languages supported by the remote device 104, grammars supported by the remote device 104, and so forth.

For example, the device interface 124 can expose an application programming interface (API) with various different methods or functions that can be invoked by the natural language description retrieval module 118. Table I illustrates an example of methods or functions that can be exposed by the device interface 124. It should be noted that these methods or functions are examples, and that other methods or functions can be supported, and/or not all methods or functions included in Table I need be supported.

TABLE I

| Method or Function | Description |
|---|---|
| Get Supported Languages | Returns an indication of languages supported by the remote device. These are languages for which the remote device has a natural language description including one or more natural language strings in that language. |
| Get Supported Grammars | Returns an indication of grammars supported by the remote device. These are grammars for which the remote device has a natural language description including one or more natural language strings in that grammar. |
| Get Supported Language And Grammar Combinations | Returns an indication of language and grammar combinations supported by the remote device. These are combinations for which the remote device has a natural language description including one or more natural language strings in that language and grammar. |
| Get Natural Language Description | Returns an indication of the natural language description. This indication can be the natural language description, or an identifier of where the natural language description can be obtained. |

The languages and/or grammars supported by the remote device 104 can be determined by the remote device 104 in various manners. In one or more embodiments, each natural language description for the remote device 104 includes an indication of the languages and/or grammars for which that natural language description includes one or more natural language strings. Additionally or alternatively, the supported languages and/or grammars can be determined in other manners. For example, a list or record of supported languages and/or grammars can be maintained at the remote device 104, another service or device can be accessed (e.g., via a network such as the Internet) to obtain a list or record of supported languages and/or grammars, and so forth.

In one or more embodiments, the natural language description retrieval module 118 requests the natural language description for the remote device 104 from the remote device 104. This request can be, for example, having the remote device interface 114 invoke a Get Natural Language Description method or function exposed by the device interface 124.

The remote device 104 supports multiple different languages and/or grammars. In one or more embodiments, the natural language description retrieval module 118 identifies the language used by the natural language assistant 112, such as by communicating a request to the natural language assistant 112 for the language used by the natural language assistant 112, checking various settings of the computing device 102 and/or an operating system running on the computing device 102, and so forth. The natural language description retrieval module 118 also identifies the grammar used by the natural language assistant 112, such as by communicating a request to the natural language assistant 112 for the grammar used by the natural language assistant 112, checking various settings of the computing device 102 and/or an operating system running on the computing device 102, and so forth. The natural language description retrieval module 118 then communicates a request to the remote device 104 for the natural language description for the language used by the natural language assistant 112 as well as for the grammar used by the natural language assistant 112.

Additionally or alternatively, the natural language description retrieval module 118 can obtain an indication of supported languages and/or grammars from the remote device 104. This indication can be obtained by, for example, invoking various methods or functions of the remote device 104 as discussed above. The natural language description retrieval module 118 can then use this information to determine which language and/or grammar to use. The determination can be made in various manners, such as by requesting user input regarding which language he or she desires and which grammar (e.g., which of multiple natural language assistants on the computing device 102) he or she desires.

The natural language description for the remote device 104 can be stored in various locations, and the manner in which the natural language description is provided to the natural language description retrieval module 118 can vary.

In one or more embodiments, the natural language description is maintained in the natural language description store 126 of the remote device 104. The natural language description store 126 can be any of a variety of different storage devices, such as ROM, a solid state drive (e.g., Flash memory), a magnetic disk, and so forth. In such embodiments, the device interface 124 retrieves the natural language description from the natural language description store 126 and communicates the natural language description to the natural language description retrieval module 118. The natural language description store 126 can be implemented as part of the remote device 104, or as an external storage device coupled to the remote device 104 (e.g., via a wired or wireless connection, such as a Universal Serial Bus (USB) connection, a wireless USB connection, and so forth).

Additionally or alternatively, the natural language description for a remote device can be stored in a natural language description repository 132 separate from the remote device 104. The natural language description repository 132 is a storage device, such as a solid state drive, magnetic disk, optical disc, and so forth. The natural language description repository 132 is accessed via a network 134. The network 134 can be a variety of different networks, including the Internet, a LAN, a phone network, an intranet, other public and/or proprietary networks, combinations thereof, and so forth.

In situations in which the natural language description is not stored at the remote device 104, the natural language description store 126 includes an indication of the location where the natural language description for the remote device 104 can be obtained. This indication can be, for example, a uniform resource indicator (URI). In one or more embodiments, this indication is an identifier of a schema that includes the natural language description for a class of devices of which the remote device 104 is a part. The schema is a defined structure or organization for data, and in the discussions herein the schema includes a natural language description. A schema is identified by a well-known type string that is specific to the protocol being used to communicate with the remote device. This type string may be registered by an organization such as the Internet Assigned Numbers Authority (IANA), the Bluetooth® Special Interest Group (SIG), AllJoyn®, or the like, or other vendor-specific organization. For example, Bluetooth® device schemas can be in reference to a particular Bluetooth® profile or Bluetooth® Generic Attribute Profile (GATT) characteristic ID, AllJoyn® device schemas can be the interface name, OCF device schemas can be the resource-type name, and so forth.

The device interface 124 retrieves the indication of the location where the natural language description is stored from the natural language description store 126 and communicates the indication to the natural language description retrieval module 118. The natural language description retrieval module 118 can then access the location and retrieve the natural language description from that location. The natural language description retrieval module 118 can access a URI provided by the remote device 104, or alternatively search for (or access an otherwise known location) for a schema for a class of devices that includes the remote device 104.

As discussed above, in some embodiments different natural language descriptions are maintained for the remote device 104, such as for different languages and/or grammars. In such embodiments, all of the natural language descriptions for the remote device 104 can be stored at the same location (e.g., the natural language description store 126 or the natural language description repository 132). Alternatively, different natural language description store for the remote device 104 can be maintained in different locations. For example, the natural language descriptions for some languages and grammars can be stored in the natural language description store 126, and the natural language descriptions for other languages and grammars can be stored in the natural language description repository 132.

The command determination module 116 provides the natural language strings from the obtained natural language description to the natural language assistant 112. The natural language assistant 112 monitors natural language inputs to the computing device 102. In one or more embodiments, these natural language inputs are voice inputs. Additionally or alternatively, the natural language inputs can be other types of inputs, such as text or chat inputs (e.g., the natural language assistant can be a chatbot).

Various different natural language assistants 112 can be used with the techniques discussed herein. For example, the natural language assistant 112 can be the Cortana® digital agent available from Microsoft Corporation, the Siri® voice recognition software available from Apple Inc., and so forth.

The natural language assistant 112 monitors natural language inputs to the computing device 102. These natural language inputs can be input to the computing device 102 in various manners, such as via a microphone of or coupled to the computing device 102, via a physical keyboard of or coupled to the computing device 102, via a touchscreen of the computing device 102, and so forth.

The natural language assistant 112 monitors the received natural language inputs to identify natural language inputs that match the one or more natural language strings provided by the command determination module 116. Various different criteria can be used to determine whether a natural language input matches a natural language string. In one or more embodiments, the natural language input matches a natural language string if the natural language input is the same as the natural language string (e.g., the natural language assistant 112 determines that there is at least a threshold probability (e.g., 90%) that the natural language input is the same as the natural language string). For example, if the one or more natural language strings provided to the natural language assistant 112 include the phrase "turn on", and the natural language assistant 112 determines that there is at least a 90% probability that the natural language input is the phrase "turn on", then the natural language input matches the natural language string.

In one or more embodiments, the natural language description for the remote device 104 includes one or more variables. For example, the natural language description for the remote device 104 may support a string of "Turn off X lights" for a command, where X is a variable that refers to location (e.g., kitchen, living room, downstairs, outdoor, etc.). The device control module 118 provides information regarding the valid variables for the commands to the natural language assistant 112. The device control module 118 can obtain the information regarding the valid variables for the commands from various sources, such as from the natural language description, from metadata associated with the natural language description, and so forth.

In one or more embodiments, the values of variables are established when the remote device 104 is installed or configured. For example, the location of the remote device (e.g., kitchen, living room, downstairs, outdoor, etc.) can be established and maintained as metadata associated with the remote device 104 when the remote device 104 is installed or configured. Additionally or alternatively, the values of variables are established at other times, such as while natural language inputs are received at the computing device 102. For example, a current location of the computing device (e.g., kitchen, living room, downstairs, outdoor, etc.) can be determined by the device control module 114 and provided to the natural language assistant 112, which uses that location while determining matches for natural language inputs to the natural language string.

Additionally or alternatively, the natural language assistant 112 may not identify values for the variables, but rely on the device control module 114 to interpret the variables appropriately when a natural language input matches a natural language string. In such situations, the natural language description indicates that variables are acceptable at certain points in the string, and the natural language assistant 112 processes those variables out and leaves their interpretation up to the device control module 114. For example, the natural language assistant 112 may identify that a natural language input matches the string "Turn off X lights" without identifying what the value of the variable X is (e.g., by identifying that "Turn off" was input followed by "lights" within a threshold number of characters or words, within a threshold amount of time, etc.). The command determination module 116 then determines the value of the variable X, such as being the current location of the computing device 102.

The natural language assistant 112 notifies the command determination module 116 when a natural language input to the computing device 102 matches a natural language string. This notification can take various forms, such as an indication of which natural language string was matched. In response to this indication that a natural language input matches a natural language string, the command determination module 116 determines the command that corresponds to the matched natural language string. This determination is made, for example, by accessing the natural language description for the remote device 104 to determine which command maps to the matched natural language string. The command determination module 116 then issues the identified command to the remote device 104, and the remote device 104 performs the command.

Thus, the natural language assistant 112 is leveraged to provide natural language support to the remote device 104. The developer of the remote device 104 need not create and implement a natural language processing service. Rather, the natural language processing capabilities of the natural language assistant 112 are used, and the command determination module 116 uses the results of that processing to determine which commands to send to the remote device 104. Furthermore, the command determination module 116 maps detected natural language inputs to commands or functionality supported by the remote device 104. This allows various publicly available protocols to be used to communicate commands from the device control module 114 to the remote device 104—a new protocol supporting natural language inputs need not be provided. The remote device 104 need not have, and typically does not have, any knowledge that the command was received as a natural language input as opposed to selection of a button, menu item, or other input mechanism via an application running on the computing device 102.

Figure 3:
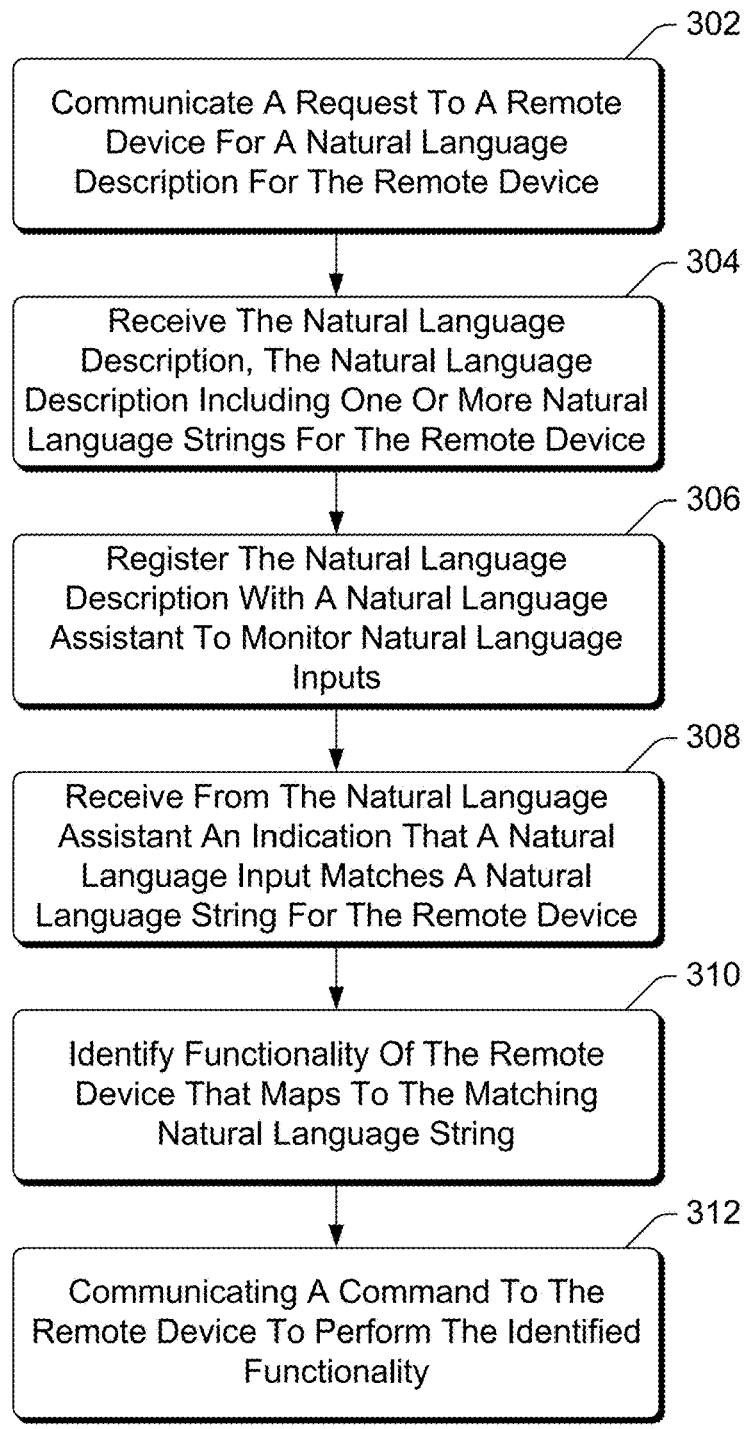
FIG. 3 is a flowchart illustrating an example process for a device implementing the device-described natural language control in accordance with one or more embodiments.

FIG. 3 is a flowchart illustrating an example process 300 for a device implementing the device-described natural language control in accordance with one or more embodiments. Process 300 is carried out by a device control module of a computing device, such as device control module 114 of FIG. 1, and can be implemented in software, firmware, hardware, or combinations thereof. Process 300 is shown as a set of acts and is not limited to the order shown for performing the operations of the various acts. Process 300 is an example process for implementing the device-described natural language control; additional discussions of implementing the device-described natural language control are included herein with reference to different figures.

In process 300, a request for a natural language description for a remote device is communicated to the remote device (act 302). The request is sent from the device control module via a remote device interface as discussed above. The request can be communicated in different manners, such as via a method or function exposed by the remote device. In one or more embodiments, the remote device supports multiple different languages and/or grammars. In such embodiments, the request in act 302 is a request for a natural language description for the remote device in a particular language and/or grammar.

The natural language description is received (act 304). The natural language description includes one or more natural language strings for the remote device as discussed above. The natural language description can be received in different manners as discussed above, such as from the remote device, from a location indicated by the remote device, and so forth.

The natural language description is registered with a natural language assistant for the natural language assistant to monitor natural language inputs (act 306). Registering the natural language description with the natural language assistant refers to, for example, providing the natural language description to the natural language assistant. As part of registering the natural language description with the natural language assistant, the one or more natural language strings in the natural language description received in act 304 are provided to the natural language assistant. The natural language assistant can be implemented on the same computing device as implements the device control module, or alternatively the natural language assistant can be implemented at least in part on another device (e.g., a cloud service).

An indication is received from the natural language assistant that a natural language input matches a natural language string for the remote device (act 308). The natural language assistant monitors natural language inputs as discussed above, and when a natural language input matching one of the natural language strings for the remote device is detected by the natural language assistant, the natural language assistant notifies the device control module.

Functionality of the remote device that maps to the matching natural language string is identified (act 310). This mapping functionality is identified using the natural language description as discussed above. This identification in act 310 includes, for example, identifying the command associated with or mapped to the matching natural language string.

A command to perform the identified functionality is communicated to the remote device (act 312). This command is communicated via a wireless interface as discussed above, and in response the remote device performs the identified functionality.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
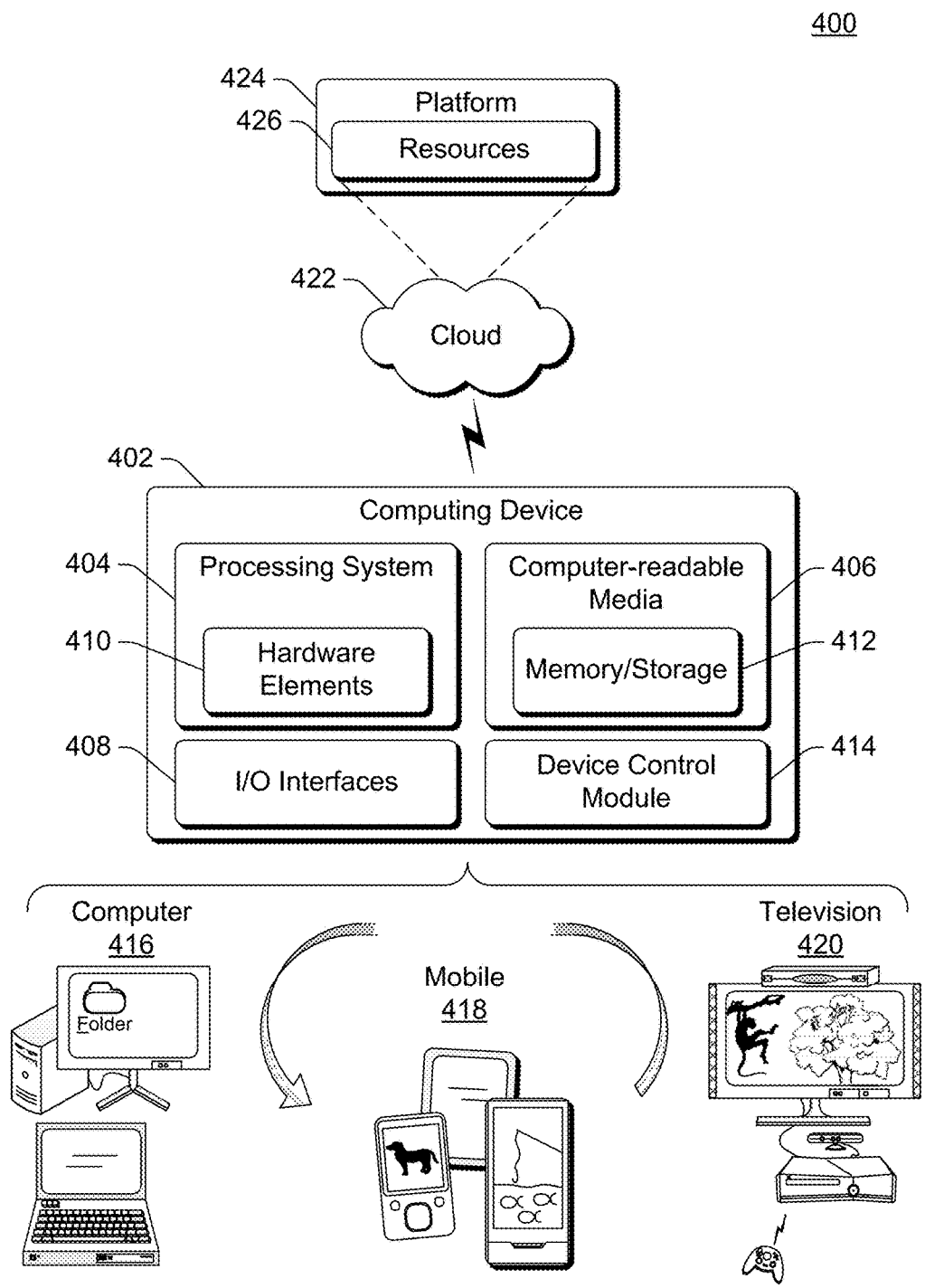
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Resistive RAM (ReRAM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

The one or more input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

The computing device 402 also includes a device control module 414. The device control module 414 provides various functionality supporting natural language input control of a remote device as discussed above. The device control module 414 can implement, for example, the device control module 114 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 416, mobile 418, and television 420 uses. Each of these configurations includes devices that may have generally different constructs and capabilities, and thus the computing device 402 may be configured according to one or more of the different device classes. For instance, the computing device 402 may be implemented as the computer 416 class of a device that includes a personal computer, desktop computer, a multi-screen computer, laptop computer, netbook, and so on.

The computing device 402 may also be implemented as the mobile 418 class of device that includes mobile devices, such as a mobile phone, portable music player, portable gaming device, a tablet computer, a multi-screen computer, and so on. The computing device 402 may also be implemented as the television 420 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 422 via a platform 424 as described below.

The cloud 422 includes and/or is representative of a platform 424 for resources 426. The platform 424 abstracts underlying functionality of hardware (e.g., servers) and software resources of the cloud 422. The resources 426 may include applications and/or data that can be utilized while computer processing is executed on servers that are remote from the computing device 402. Resources 426 can also include services provided over the Internet and/or through a subscriber network, such as a cellular or Wi-Fi network.

The platform 424 may abstract resources and functions to connect the computing device 402 with other computing devices. The platform 424 may also serve to abstract scaling of resources to provide a corresponding level of scale to encountered demand for the resources 426 that are implemented via the platform 424. Accordingly, in an interconnected device embodiment, implementation of functionality described herein may be distributed throughout the system 400. For example, the functionality may be implemented in part on the computing device 402 as well as via the platform 424 that abstracts the functionality of the cloud 422.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: sending a request to a remote device for a natural language description for the remote device, the natural language description for the remote device mapping one or more natural language strings to each of one or more functionalities of the remote device; receiving the natural language description; registering the natural language description with a natural language assistant to monitor natural language inputs to the computing device; receiving, from the natural language assistant, an indication that a natural language input to the computing device matches a natural language string in the natural language description; identifying particular functionality of the remote device that maps to the matching natural language string; and communicating a command to the remote device to perform the particular functionality.

Alternatively or in addition to any of the above described methods, any one or combination of: the one or more natural language strings comprising one or more words; the one or more natural language strings comprising one or more phrases; the one or more natural language strings comprising one or more optional words or characters; the natural language input comprising voice input; the natural language input comprising text or chat input; the receiving comprising receiving the natural language description from the remote device in response to the request for the natural language description; the method further comprising receiving, from the remote device in response to the request for the natural language description, an indicator of a location in a natural language description repository where the natural language description is stored, and the receiving the natural language description comprising retrieving the natural language description from the natural language description repository; the natural language description being a schema for a class of devices that includes the remote device; the remote device having a different natural language description for each of multiple different languages, the sending comprising sending a request for a natural language description for a particular one of the multiple different languages; the remote device having a different natural language description for each of multiple different grammars, the sending comprising sending a request for a natural language description for a particular one of the multiple different grammars; the remote device comprising a smart device.

A computing device comprising: a natural language description retrieval module configured to communicate a request to a remote device for a natural language description for the remote device, the natural language description for the remote device mapping one or more natural language strings to each of one or more commands for the remote device, and to obtain the natural language description; and a command determination module configured to provide the one or more natural language strings to a natural language assistant to monitor natural language inputs to the computing device, to receive, from the natural language assistant, an indication that a natural language input to the computing device matches a natural language string in the natural language description, to identify a particular command of the remote device that maps to the matching natural language string, and to communicate the particular command to the remote device.

Alternatively or in addition to any of the above described computing devices, any one or combination of: the one or more natural language strings comprising at least one word and at least one phrase; the natural language input comprising voice input; the remote device having a different natural language description for each of multiple different grammars, the natural language description retrieval module being further configured to request a natural language description for a particular one of the multiple different grammars; the natural language description retrieval module being further configured to receive the natural language description from the remote device in response to the request for the natural language description.

A computing device comprising: a processor; and a computer-readable storage medium having stored thereon multiple instructions that, responsive to execution by the processor, cause the one or more processors to perform acts comprising: send a request to a remote device for a natural language description for the remote device, the natural language description for the remote device mapping one or more natural language strings to each of one or more commands for the remote device; receive the natural language description; provide the one or more natural language strings to a natural language assistant to monitor natural language inputs to the computing device; receive, from the natural language assistant, an indication that a natural language input to the computing device matches a natural language string in the natural language description; identify a particular command of the remote device that maps to the matching natural language string; and communicate the particular command to the remote device.

Alternatively or in addition to any of the above described computing devices, any one or combination of: the one or more natural language strings comprising at least one word and at least one phrase; the remote device having a different natural language description for each of multiple different grammars, and wherein to send the request is to send a request for a natural language description for a particular one of the multiple different grammars.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    establishing a communication link with a remote device having a plurality of natural language descriptions that map one or more natural language strings to individual functionalities of the remote device in a plurality of different natural languages that are supported by the remote device;
    determining that the plurality of different natural languages that are supported by the remote device includes a particular natural language that is used by a natural language assistant that operates on the computing device;
    sending, to the remote device having the plurality of natural language descriptions, a request for at least one natural language description for the remote device in the particular natural language that is used by the natural language assistant to receive natural language inputs at the computing device;
    receiving, from the remote device, the at least one natural language description in the particular natural language;
    updating, at the computing device, the natural language assistant based on the at least one natural language description to enable the natural language assistant to monitor, at the computing device, the natural language inputs for the remote device in the particular natural language;
    receiving, from the natural language assistant, an indication that a particular natural language input to the computing device matches a particular natural language string in the at least one natural language description;
    identifying a particular functionality of the remote device that maps to the particular natural language string; and
    communicating a command to the remote device to perform the particular functionality.

2. The method as recited in claim 1, the one or more natural language strings comprising one or more words.

3. The method as recited in claim 1, the one or more natural language strings comprising one or more phrases.

4. The method as recited in claim 1, the one or more natural language strings comprising one or more optional words or characters.

5. The method as recited in claim 1, the particular natural language input comprising voice input.

6. The method as recited in claim 1, the particular natural language input comprising text or chat input.

7. The method as recited in claim 1, the at least one natural language description being a schema for a class of devices that includes the remote device.

8. The method as recited in claim 1, the remote device having a different natural language description for each of the plurality of different languages that are supported by the remote device.

9. The method as recited in claim 1, the remote device comprising a smart device.

10. A computing device comprising:
    one or more processing units; and
    a computer-readable medium having encoded thereon computer-executable instructions to cause the one or more processing units to:
        determine that a plurality of languages that are supported by a remote device includes a particular language that is used by a natural language assistant that operates on the computing device;
        communicate to the remote device, that maintains natural language descriptions corresponding to the plurality of languages, a request for a natural language description for the remote device in the particular language that is used by the natural language assistant that operates on the computing device, the natural language description for the remote device mapping one or more natural language strings, in the particular language, to one or more commands for the remote device;
        obtain, from the remote device, the natural language description in the particular language;
        update the natural language assistant based on the one or more natural language strings to enable the natural language assistant to monitor, at the computing device, natural language inputs for the remote device in the particular language that is used by the natural language assistant that operates on the computing device;
        receive, from the natural language assistant, an indication that a particular natural language input to the computing device in the particular language matches a particular natural language string of the natural language description;
        identify a particular command of the remote device that maps to the particular natural language string;
        communicate, to the remote device, the particular command to cause the remote device to perform a functionality corresponding to the particular command.

11. The computing device as recited in claim 10, the one or more natural language strings comprising at least one word and at least one phrase.

12. The computing device as recited in claim 10, the particular natural language input comprising voice input.

13. The computing device as recited in claim 10, the remote device having a different natural language description for each of multiple different grammars, the computer-executable instructions to cause the one or more processing units to request a natural language description for a particular one of the multiple different grammars.

14. The computing device as recited in claim 10, the computer-executable instructions to cause the one or more processing units to receive the natural language description from the remote device in response to the request for the natural language description.

15. A computing device comprising:
    a processor; and
    a computer-readable storage medium having stored thereon multiple instructions that, responsive to execution by the processor, cause the one or more processors to perform acts comprising:
        determining that a plurality of languages that are supported by a remote device includes a particular language that is used by a natural language assistant that operates on the computing device;
        sending to the remote device, that maintains natural language descriptions corresponding to the plurality of languages, a request for a natural language description for the remote device in the particular language that is used by the natural language assistant to receive natural language inputs for the remote device at the computing device, the natural language description for the remote device mapping one or more natural language strings, in the particular language, to one or more commands for the remote device;

receiving, from the remote device, the natural language description in the particular language;

updating the natural language assistant based on the natural language description to enable the natural language assistant to monitor the natural language inputs for the remote device in the particular language;

receiving, from the natural language assistant, an indication that a particular natural language input to the computing device in the particular language matches a particular natural language string in the natural language description;

identifying a particular command of the remote device that maps to the particular natural language string; and communicating the particular command to the remote device.

16. The computing device as recited in claim 15, the one or more natural language strings comprising at least one word and at least one phrase.

17. The computing device as recited in claim 15, the remote device having a different natural language description for each of multiple different grammars, and wherein to send the request is to send a request for a natural language description for a particular one of the multiple different grammars.

18. The computing device as recited in claim 15, wherein the plurality of languages include at least two of an English language, a Chinese language, a Spanish language, and a German language.

19. The computing device as recited in claim 15, wherein the determining that the plurality of languages that are supported by the remote device includes the particular language includes receiving an indication of one or more spoken languages that are supported by the remote device for initiating one or more functionalities at the remote device.

20. The computing device as recited in claim 15, wherein the determining that the plurality of languages that are supported by the remote device includes the particular language includes querying one or more settings of the computing device.

* * * * *